United States Patent
Samdanis

(10) Patent No.: US 8,897,264 B2
(45) Date of Patent: Nov. 25, 2014

(54) METHOD AND APPARATUS FOR PERFORMING RELAY NODE CONFIGURATION RE-CONFIGURATION IN RELAY ENHANCED NETWORKS

(75) Inventor: Konstantinos Samdanis, Dossenheim (DE)

(73) Assignee: NEC Europe Ltd., Heidelberg (DE)

( * ) Notice: Subject to any disclaimer, the term of this patent is extended or adjusted under 35 U.S.C. 154(b) by 149 days.

(21) Appl. No.: 13/699,744

(22) PCT Filed: Mar. 31, 2011

(86) PCT No.: PCT/EP2011/001634
§ 371 (c)(1),
(2), (4) Date: Nov. 26, 2012

(87) PCT Pub. No.: WO2012/130261
PCT Pub. Date: Oct. 4, 2012

(65) Prior Publication Data
US 2013/0077494 A1    Mar. 28, 2013

(51) Int. Cl.
| | |
|---|---|
| *H04W 16/08* | (2009.01) |
| *H04W 36/00* | (2009.01) |
| *H04W 28/08* | (2009.01) |
| *H04B 7/155* | (2006.01) |
| *H04W 24/02* | (2009.01) |
| *H04W 28/06* | (2009.01) |
| *H04W 36/22* | (2009.01) |
| *H04W 74/00* | (2009.01) |
| *H04W 84/04* | (2009.01) |

(52) U.S. Cl.
CPC .............. *H04W 28/08* (2013.01); *H04B 7/155* (2013.01); *H04W 24/02* (2013.01); *H04W 28/06* (2013.01); *H04W 36/22* (2013.01); *H04W 74/00* (2013.01); *H04W 84/047* (2013.01)
USPC ............................ 370/331; 415/436; 415/453

(58) Field of Classification Search
None
See application file for complete search history.

(56) References Cited

U.S. PATENT DOCUMENTS

| | | | |
|---|---|---|---|
| 2009/0181694 A1 | 7/2009 | Byun et al. | |
| 2011/0019617 A1* | 1/2011 | Ho et al. | ......................... 370/328 |

(Continued)

OTHER PUBLICATIONS

International Search Report, dated Dec. 27, 2011, from corresponding PCT application.

(Continued)

*Primary Examiner* — Duc Duong
(74) *Attorney, Agent, or Firm* — Young & Thompson

(57) ABSTRACT

A method for performing relay node configuration and re-configuration in relay enhanced networks, in particular in a 3GPP LTE-Advanced architecture, wherein the network includes a plurality of eNBs that function as donor eNBs providing wireless access to associated relay nodes, wherein the relay nodes function as eNBs from a UE perspective, is characterized in that the network is divided into clusters such that each cluster includes exactly one donor eNB and that each relay node is associated to at least one donor eNB any point in time, wherein the load of donor eNBs and the handover rates among relay nodes as well as between donor eNBs and relay nodes are monitored and/or estimated, wherein the association of relay nodes to donor eNBs is performed on the basis of the results of the monitoring and/or estimation. Furthermore, an apparatus for performing centralized relay node configuration in relay enhanced networks is disclosed.

23 Claims, 5 Drawing Sheets

(56) References Cited

U.S. PATENT DOCUMENTS

Figure 1A:
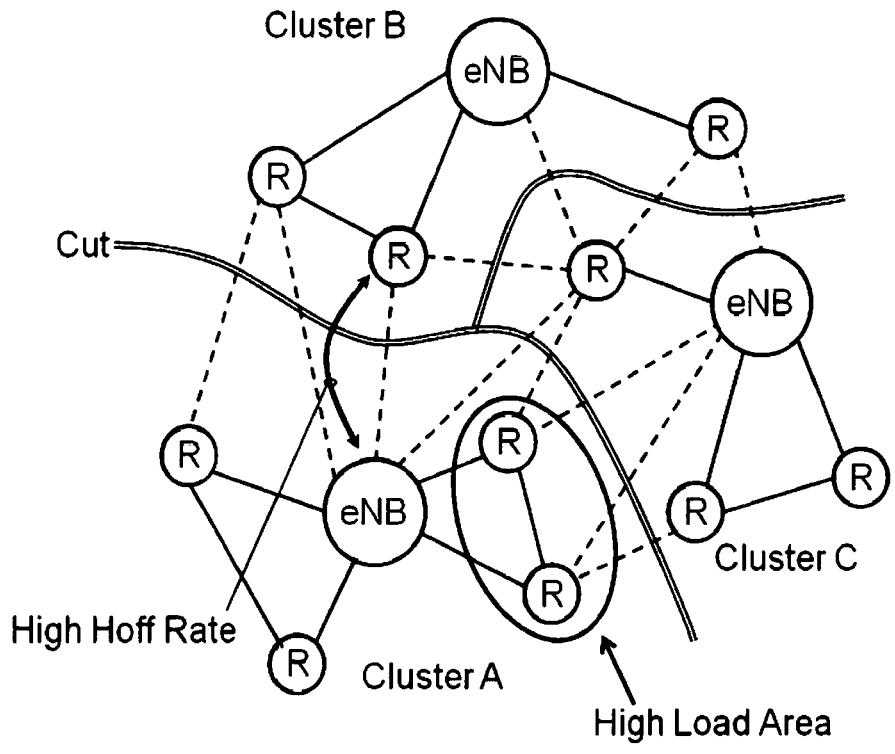

2011/0081903 A1* 4/2011 Cai et al. .................. 455/424
2011/0216741 A1* 9/2011 Yang et al. ................ 370/331
2012/0028664 A1* 2/2012 Zhang et al. .............. 455/501
2012/0322363 A1* 12/2012 Tsubouchi et al. ............ 455/9
2013/0021962 A1* 1/2013 Hu et al. .................. 370/315
2013/0250918 A1* 9/2013 Liu et al. .................. 370/332
2014/0148176 A1* 5/2014 Raaf et al. ................ 455/445

OTHER PUBLICATIONS

Oumer Teyeb et al., "Dynamic Relaying in 3GPP LTE-Advanced Networks", EURASIP Journal on Wireless Communications and Networking, Jan. 1, 2009, pp. 1-11, vol. 2009, Article ID: 731317, XP-002572643.

Sudhir DIXIT et al., "Self-Organization of Relay-Based Next Generation Radio Access Networks (RANS)", Personal Wireless Communications, Jan. 23, 2005, pp. 197-201.

* cited by examiner

METHOD AND APPARATUS FOR PERFORMING RELAY NODE CONFIGURATION RE-CONFIGURATION IN RELAY ENHANCED NETWORKS

BACKGROUND OF THE INVENTION

The present invention relates to a method and apparatus for performing relay node configuration and re-configuration in relay enhanced networks, in particular in a 3GPP LTE-Advanced architecture, wherein said network includes a plurality of eNBs that function as donor eNBs providing wireless access to associated relay nodes, wherein said relay nodes function as eNBs from a UE perspective.

DESCRIPTION OF THE RELATED ART

Relaying is a significant network enhancement option, which is expected to improve the return on investment providing higher average revenue per user within the target service at lower overall incremental cost. Relay technologies offer wireless network access avoiding the installation of a wired connection and provide the means for network flexibility encouraging the development of dynamic optimization methods.

The basic 3GPP LTE-Advanced relay architecture is the Proxy S1/X2 documented in 3GPP TR 36.806, 3rd Generation Partnership Project; Technical Specification Group Radio Access Network; Evolved Universal Terrestrial Radio Access (E-UTRA); Relay architectures for E-UTRA (LTE-Advanced); (Release 9), v9.0.0, March 2010, where certain eNBs (evolved NodeB, which is a base station in 3GPP terminology) called donors—donor eNBs—may provide wireless access and proxy functionality to underlying relay nodes. Relay nodes in turn may be seen as cells managed by donor eNBs hidden from the core network and at the same time may be seen as an eNB from the UE perspective. In such an LTE-Advanced architecture relay nodes need to be able to perform self-configuration procedures and self-backhauling, changing their point of attachment, i.e. the donor eNB, for certain optimization or for fault robustness purposes.

Since the vision of future network deployment strategies is towards network arrangements that employ smaller cells, the (re-)configuration/(re-)association of relay elements with donor eNBs would be more complex than nowadays due to the higher amount of re-association options and consequently would be more significant for the overall network performance.

Optimization methods that specify the association of relay nodes with donor eNBs have been studied in the past and several mathematical methods have been developed as documented in Y. Yu, S. Murphy, L. Murphy, "A Clustering Approach to Planning Base Station and Relay Station Location in IEEE 802.16j Multi-hop Relay Networks", IEEE ICC, Beijing, May 2008. Such solutions consider spectral efficiency, coverage, load and other optimization constraints but mainly suffer from two major problems. The first is based on the fact that they attempt to solve an NP complete problem with a high solution space and therefore a configuration solution within a reasonable response time is infeasible. Second, even heuristic approaches like the clustering approach proposed in the above document consider a network planning process where eNBs as well as relays have no specific location, so its use is not for network management purposes. Besides, the response time even when heuristics are used is high in range of seven to forty seconds depending on the amount of eNBs and relay nodes considered.

Current discussions in 3GPP RAN3 Group (documented in 3GPP R3-102027, RN Initial Attachment Procedure, New Postcom, August 2010, and in 3GPP R3-102285, O&M and addressing Requirements, Alcatel-Lucent, August, 2010) and certain academic proposals (documented in H. Hu, et. al, "Self-Configuration and Self-Optimization for LTE Networks", IEEE Communication Magazine, Vol. 48, No. 2, February 2010) are considering a two step relay node configuration process:

In phase 1 the relay node attaches to LTE as a User Equipment (UE) and retrieves initial parameters from the corresponding relay node OAM (Operation, Administration and Maintenance) before detaching from the network as a UE. In this phase the relay node is provided with Radio Access Network (RAN) information including a list of donor eNBs (DeNB), where the relay may be attached as well as core network information like a list of candidate MMEs (GUMMEIs) and S/P-GWs.

In a subsequent phase 2 the relay node connects to a donor eNB to start the relay specific activities. Initially the MME indicates the relay authorization to the donor eNB and setup the S1/X2 bearer. In case the relay node is attached to an eNB either not with donor functionality or not being specified by the relay node OAM, it is detached and reattached to the appropriate donor eNB. Further configuration information are then provided by the OAM including the max pilot power, frequency bands, mobility thresholds, tracking area information etc.

It is worth noting that a relay node is instructed to select a donor eNB by its OAM based usually on the radio characteristics in a two step process. Such solution exhibits serious flexibility problems in case of a failure in the relay OAM or in the indicated donor eNB. Additionally, it is difficult to capture varying traffic and mobility conditions that potentially may influence the configuration selection of donor eNB from the performance and perceived QoS perspective. Furthermore, in case a relay node is configured to a specified donor eNB and such eNB fails, the re-configuration delay experience of the existing two phase configuration process would dramatically degrade the network service quality. Such a disruption would at least be temporary until the relay completes a re-configuration process or even long term in case the corresponding OAM has no alternative configuration information.

A self-organized approach that considers the configuration of relay nodes is introduced in S. Dixit, E. Yanmaz, O. K. Tonguz, "On the Design of Self-Organized Cellular wireless Networks", IEEE Communications Magazine, Vol. 43, No. 7, July 2005, where the authors claim that an incremental deployment of new relay elements would follow a free scale paradigm, where free scales refers to a network organization that follows the power law distribution and develop a routing protocol that explores best the network arrangement.

Another self-organizing approach for relay elements is explored in P. Jiang, J. Bigham, J. Wu, "Self-organizing Relay Stations in Relay based Cellular Networks", Computer communications, Vol. 31, No. 13, August 2008, focusing on dynamic re-configuration scenarios including traffic fluctuations and donor eNB failures. Unlike the previous proposals this approach considers load conditions in the process of selecting the appropriate donor eNB. Load parameters are associated with relay elements and particular mobile users within the coverage area of specific donor eNBs. The re-configuration scheme relies on an algorithm that takes into account load and geographical position constraints. The geographical positioning constraints are related with the location of relay nodes and mobile users. The re-configuration algorithm resides on a centralized management entity, which monitors the load of the network. Once the load of a certain donor eNB is higher than normal conditions, the management entity collects the appropriate load and geographical information, triggers the re-configuration algorithm and communicates the indicated changes to the corresponding relay nodes and mobile terminals, which may perform a re-association with a different donor eNB. Relay nodes then perform the appropriate handover—re-configuration procedures.

Considering the re-configuration algorithm described in this document, it is trying to match donor eNBs starting from the least loaded ones in a greedy manner with as many mobile terminals and relay nodes as possible within their coverage area. The main problems behind this approach are concentrated on scalability, accuracy and reaction issues. The scalability is concerned with the size of the problem; the algorithm needs to consider the entire network. Although the authors suggest (without specifying a particular solution) that this issue may be avoided by concentrating the algorithm only on problematic areas, isolating such areas is not trivial. Scalability is also concerned with retrieving the essential information for the re-configuration algorithm. Load and geographical position information is necessary for each relay node and each mobile terminal residing with the donor eNBs considered by the algorithm. In addition, the re-configuration algorithm operates on per user and per relay basis examining whether the process of sifting relay nodes and even individual users satisfies load and coverage targets; an activity that raises precision concerns considering the mobile user information and the sensitivity of user mobility. Also in case of a donor eNB failure, such process might prove slow in collecting the information needed towards the centralized management system and re-configuring an alternative solution.

Besides the drawbacks described above the re-configuration algorithm presented in the above document is not considering mobility patterns with the consequence of associating into different donor eNBs relay nodes that might be involved into frequent handovers. This increases the signaling overhead in the core network and the bearer re-establishment effort. In addition, it introduces extra synchronization issues among user terminals and the core network, i.e. source and target donor eNBs as well as relay elements, in case of pre-buffering for transferring user related data during the handover procedure. Furthermore, the re-configuration procedure considers the re-association of relay nodes with donor eNBs from scratch with the objective of optimizing the load distribution among neighbor donor eNBs; a process that might introduce major changes into the existing network formation. Such changes in turn would increase the re-configuration effort as well as the complexity and signaling overhead for associating selected relay nodes with different donor eNBs.

An alternative self-organized network approach focusing on 3GPP LTE-Advanced networks, which dynamically associates relay nodes with donor eNBs, is introduced in O. Teyeb, et al., "Dynamic Relaying in 3GPP LTE-Advanced Networks", EURASIP Journal on WCN, Vol. 2009, Article No. 6, March 2009. This approach realizes the limitations of fixed relay—donor eNB association and attempts to introduce flexibility introducing autonomous relay re-configuration in order to capture traffic fluctuations, forthcoming mobile relay nodes and energy saving scenarios where certain donor eNBs enter a stand-by state of low energy expenditure. It is important to note that the proposal concentrates on both initial relay node configuration and on the re-configuration process.

In particular, this work suggests the need of a mechanism to communicate the appropriate information among relay nodes and donor eNBs in order to archive a single phase (re-)configuration. Such mechanisms should require either donor eNBs to broadcast regularly information about their load condition, energy saving state and about geographical location where they experience outage problems or require relay nodes to query such information from certain candidate donor eNBs using the Radio Resource Control (RRC) protocol. In this way relay nodes would avoid being connected to a non donor eNB or to a donor eNB with either no available resource or to a donor scheduled to enter a stand-by state. In addition relay nodes would have knowledge regarding outage locations being more supportive to problematic donor eNBs. Considering the re-configuration process the donor eNB decides to handover an associated relay node based on measurements from neighbor donor eNBs. Once the required resources are available at the donor eNB the handover process is carried out.

It should be noted that in one variation of the proposed mechanism for the donor eNB discovery, donors must advertise a high amount of information towards relay nodes including load, energy status, coverage and outage; a process that requires a huge standardization effort because of the changes it introduces into the signaling. In addition, both variations within this process place the initial configuration and re-configuration decision, i.e. the donor eNB selection, on the relay nodes providing only local information. Besides the lack of operator control and security concerns of this approach, there are also serious performance considerations about the quality of donor eNB selection due to the limited scope of the available information.

Further, it is worth noting that this self-organized relay proposal provides some generic suggestions and is more focused on the relay handover process, without contributing a solid (re-)configuration method or algorithm. In addition, similarly to the previous scheme, this approach is not considering mobility in the (re-)configuration process and is also not considering identifying solutions that would minimize the number of relay node—donor eNB re-associations.

SUMMARY OF THE INVENTION

It is therefore an object of the present invention to improve and further develop a method and an apparatus for performing relay node configuration in relay enhanced networks of the initially described type in such a way that high flexibility and robustness is provided to the relay node configuration and that at the same time the overall network performance is optimized.

In accordance with the invention, the aforementioned object is accomplished by a method comprising the features of claim 1. According to this claim such a method is characterized in that said network is divided into clusters such that each cluster includes exactly one donor eNB and that each relay node is associated to at least one donor eNB any point in time,
    wherein the load of donor eNBs and the handover rates among relay nodes as well as between donor eNBs and relay nodes are monitored and/or estimated,
    wherein the association of relay nodes to donor eNBs is performed on the basis of the results of said monitoring and/or estimation.

Furthermore, the aforementioned object is accomplished by an apparatus comprising the features of claim 23. According to this claim such an apparatus is characterized in that it includes a centralized management entity that is configured to divide said network into clusters such that each cluster includes exactly one donor eNB and that each relay node is associated to at least one donor eNB any point in time, to receive monitored and/or estimated information regarding the load of donor eNBs and the handover rates among relay nodes as well as between donor eNBs and relay nodes, and to perform association of relay nodes to donor eNBs is on the basis of the results of said monitored and/or estimated information.

According to the present invention it has been recognized that an optimization of the (re-)configuration or otherwise (re-)association of relay nodes with donor eNBs in a flexible and autonomous or otherwise self-organized network manner can be achieved by considering in the optimization process the load of donor eNBs and relay nodes to provide load balancing. Additionally or alternatively, also user mobility patterns are considered in order to minimize inter-donor eNB handovers and associated signaling as well as bearer re-establishment effort among relay nodes that belong to different donor eNBs. Blending load balancing and handover optimization is particularly important for relay nodes located near the edge of a cell among different donor eNBs. In this context it is important to note that the method according to the present invention not the position of a new relay node is considered, but instead the association with the optimal donor eNB.

Beside its contribution into the load balancing process and the handover optimization, the method according to the present invention is particularly useful in case where certain donor eNBs fail because of its fast response times or when a donor eNB is scheduled to enter a stand-by mode because it could flexibly re-associate the affected relay nodes with other neighboring donors.

Another optimization aspect of the present invention also considers the amount of relay node-donor eNB re-associations to ensure that the minimum amount of changes are introduced into the existing relay enhanced network formation ensuring a low overall re-configuration cost. The present invention takes into account and addresses these issues by considering handover rates among donor eNBs and relay nodes or among relay nodes that either belong to the same or to different donor eNBs. In addition, this invention initiates from the existing network formation introducing iterative changes among relay node and donor eNB association. Its objective is to introduce minimal changes, while satisfying pre-determined load and mobility rate targets. In this way less overhead and complexity is ensured in the process of configuring the new network formation. Moreover, to address these issues, the present invention focuses on providing single phase solutions that would improve the re-configuration response in case of donor eNB or OAM failure and would bring the configuration decision functionality closer to the radio access network, exhibiting self-organized network (SON) properties.

To summarize, the method and apparatus according to the present invention optimize the configuration of relay nodes either when a new element is deployed or when a network alternation occurs in terms of traffic load and mobility patterns, fault or for energy saving purposes. The invention presents the only distributed solution known so far that minimizes the number of steps, i.e. amount of network changes. In addition, it is the only solution known so far that considers mobility information to enhance the performance of donor eNBs and the quality perceived by end users when associated relay nodes are involved in frequent inter-donor eNB handovers. Finally, the invention presents the only solution that tries to minimize the amount of changes introduced in the relay enhanced network in order to minimize the associated overhead cost.

According to a specific embodiment the association of relay nodes to donor eNBs may be controlled by a centralized management entity. The management entity may reside, e.g., inside the core network. Alternatively, the association of relay nodes to donor eNBs may be performed by applying a distributed approach that may reside inside donor eNBs that coordinate with each other, thus being closer to the radio access network than the centralized approach. The benefits of the distributed approach are more evident in connection with re-configuration processes, in which associations of relay nodes to certain donor eNBs are changed, and mainly concern fast reaction, which is desired for example in case of failure of donor eNBs. The proposed methods, i.e. both the centralized and the distributed approach, utilize load and handover rates among radio network elements including relay nodes and donor eNBs, while also taking into account donor eNBs that are faulty or are scheduled to enter a stand-by mode.

Advantageously, each new relay node, upon being placed into the network, advertises itself as a relay node to be associated with a donor eNB. In other words, the new relay nodes, once they are powered-on, advertise to the nearby donor eNBs that they are relays, alerting them in this way that an initial configuration procedure is needed. Donor eNBs either coordinate following a distributed method or transfer such configuration request toward the centralized management entity. In the distributed coordination method the donor eNB that is least loaded informs the remaining donors that it is responsible for the relay node configuration. In either centralized or distributed method an algorithm is executed to finalize the relay configuration decision. Details of these algorithms are provided in the following text.

Specifically, according to a preferred embodiment nearby donor eNBs that receive such advertising message from a new relay node may trigger a self-configuration procedure for the new relay node at the centralized management entity, or may coordinate with each other in order to specify the donor eNB that may perform the self-configuration of the new relay node in a distributed manner. In particular, considering the centralized approach, all candidate donor eNBs, i.e. the eNBs that may provide wireless access to the relay node based on the radio characteristics, propagate to the centralized management entity an estimation regarding the load and handover rates associated with the geographical position of the new relay node. Load and handover information may be estimated at each candidate donor eNBs, via the positioning of mobile terminals in the area where the new relay node will operate, using e.g. the methods described in document 3GPP TS. 25.111, Technical Specification Group RAN; LMU performance specification; UE positioning in UTRAN, (Rel 9), December 2009, the disclosure of which is incorporated herein by way of reference.

As mentioned above the distributed approach requires coordination among the candidate donor eNBs (i.e. those donor eNBs that as a result of the given radio characteristics could potentially provide wireless access the respective relay node) select the least loaded one as responsible for the configuration process. Such coordination alternative may be arranged in advance based on an explicit rule that resides on each donor eNB in combination with local load information that each donor maintains for load balancing purposes.

In a preferred embodiment conflicts among donor eNBs (e.g. in form of tie-breaks) in the coordination process, which may result e.g. from the fact that multiple involved eNBs have approximately the same load, may be resolved by considering the status of neighbor eNBs. This means that tie breaks are coordinated by the involved donor eNBs considering the load of their further neighbor eNBs. By applying this activity it is possible to select a donor eNB that is unlikely to be engaged into another near future load balancing process, thereby ensuring a more stable solution.

In order to assure that the association of relay nodes to optimal donor eNBs (in an initial deployment phase) as well as re-associations (in a subsequent operation phase) can be performed in an efficient and flexible way, the donor eNBs may provide load, mobility and/or geographical information with respect to associated relay nodes. This information may either be propagated to the centralized management entity, or, in case of the distributed approach, may be kept updated on the donor eNBs themselves.

According to a preferred embodiment load balancing among neighbor donor eNBs and/or inter-cluster, i.e. inter-donor eNB handover rate reduction is performed by means of changing the association of relay nodes.

Further relay node—donor eNB adjustments may be performed in a similar manner as the case of load balancing in order to conserve energy for individual donor eNBs. The assumption behind this proposal is that each eNB spends a particular energy amount for operating certain function like, for instance, a specific number of carriers corresponding to particular traffic load levels. Such energy consumption is scaled to specific expenditure levels and therefore balancing the load among neighbor donor eNBs by means of changing the association of relay nodes has a significant contribution into the energy consumption of each donor. In addition, such load balancing process may delay the re-activation of certain donor eNBs, which are in stand-by mode in case the traffic demands increases, conserving in this way even more energy.

In particular, it may be provided that relay node association changes between neighboring clusters are carried out according to an algorithm that is configured to reduce the inter-cluster handover rates and provide load balancing among neighboring clusters. To accomplish such targets an iterative improvement algorithm may be adopted, which performs a series of relay node—donor eNB association changes. Such algorithm requires load, mobility and geographical information regarding particular relay and donor eNB elements. As already mentioned above donor eNBs may provide such information based on regular monitoring of load and mobility regarding their side including the associated relay nodes. Geographical information related with donor eNBs may be provided in prior or discovered in a similar way as relay nodes using positioning information as, e.g., described in document 3GPP TS. 25.111, Technical Specification Group RAN; LMU performance specification; UE positioning in UTRAN, (Rel 9), December 2009.

In a specific embodiment it may be provided that, for a specific cluster under consideration, the algorithm considers a weight related to the load of each relay node associated to the specific cluster and a node gain yielding from a shift of a relay node towards a specific neighbor cluster. The term "node gain" in this context refers to the overall handover rate savings when a relay node is shifted from one donor eNB to another donor eNB, as defined in document L. A. Sanchis, "Multi-way Network Partitioning", IEEE Transactions on Computers, Vol. 38, No. 1, January 1989.

The algorithm may be triggered from a problematic cluster whose donor eNB experiences problems in terms of load and/or handover rates. In the centralized approach the management entity, upon being notified by the trigger, may be configured to select the maximum loaded donor eNB and its maximum loaded associated relay node and to perform an update procedure by trying to shift it towards its minimum loaded neighbor donor eNB.

According to another preferred embodiment it may be provided that, before performing the update procedure, the amount of related relay node shifts is stored and compared with an alternative shift relay option. Advantageously, different relay node shifting solutions are considered and compared with each other, wherein a mechanism may be provided that keeps track of the changes introduced by the different solutions. By this means the best solution option is ensured. In addition, this approach may enhance the solution space in case an overloaded cluster has highly loaded neighbors for obvious reasons.

According to still another preferred embodiment it may be provided that the algorithm considers not only clusters that are direct neighbors of a problematic cluster under consideration, but also two hop neighbor clusters of the problematic cluster. By such exploration of the potential of the neighbor clusters, although the solution space is increased, the amount of changes can be minimized. In particular, when a neighbor cluster cannot accommodate the additional load, the proposed algorithm may check whether it could shift any relay node towards its other neighbors. In this way, such neighbor cluster may create enough available load space to accommodate the initial relay node shift attempt. It should be noted that such a process is performed only when the mobility constraints are satisfied.

When more than one donor eNB is problematic at the same time, the proposed algorithms may either prioritize them, an approach followed by the centralized scheme or a coordination scheme is applied to avoid conflict when a distributed version is performed independently on each donor. Furthermore, a policy may be defined on each donor eNB according to which a cluster is allowed to be engaged only in a single relay node re-configuration process at the same time.

It is worth noting that shifting relay nodes among neighboring clusters may produce oscillations. To address such issue it may be provided that a relay node that is brought back to its original cluster is not permitted to be shifted again for a certain time period. This is particularly useful for distributed algorithms, while oscillations are not significant for centralized ones.

When a problematic donor eNB receives the appropriate load and mobility information regarding the neighbor donor eNBs and their associated relay nodes, it may be provided that it assesses their general use or applicability. For example, in case a neighbor cluster cannot accommodate any relay nodes from a problematic cluster due to geographical constraints, it should be excluded from the process in addition with its further neighbor clusters. The same could apply considering load constraints. In this way the distributed algorithms do not involve unnecessarily neighbor clusters that might be more useful for other re-configuration instances.

BRIEF DESCRIPTION OF THE DRAWING FIGURES

There are several ways how to design and further develop the teaching of the present invention in an advantageous way. To this end, it is to be referred to the patent claims subordinate to patent claim 1 and to the following explanation of preferred examples of embodiments of the invention, illustrated by the figures. In connection with the explanation of the preferred examples of embodiments of the invention by the aid of the figures, generally preferred embodiments and further developments of the teaching will be explained. In the drawings FIG. 1a/1b is a schematic view of a radio access network illustrating the modeling thereof and a load balancing and handover optimization process according to a first embodiment of the present invention, FIG. 2a/2b is a schematic view of a radio access network illustrating an energy saving and self-organized relay node association process according to a second embodiment of the present invention, FIG. 3 is a schematic view of a radio access network illustrating the concept of node gain according to a third embodiment of the present invention, FIG. 4a/4b is a schematic view of a radio access network illustrating a relay node association process with involvement of neighbor donor eNBs according to a fourth embodiment of the present invention, and FIG. 5 is a high level flow diagram illustrating relay node association in a centralized approach according to a fifth embodiment of the present invention.

DETAILED DESCRIPTION OF THE INVENTION

The main procedure of the present invention is based on a clustering heuristic approach, which relies on graph theory. The radio access network 1, as for instance illustrated in FIG. 1a, includes a plurality of eNBs that function as donor eNBs providing wireless access to associated relay nodes, wherein the relay nodes function as eNBs from a UE perspective. For the sake of clarity, UEs being served by the relay nodes are not illustrated in FIG. 1a.

The radio access network is represented by a weighted undirected graph G(V,E), where V indicates the set of network nodes that are either eNBs or relay nodes, and E denotes a set of links that correspond to the adjacency between two radio access elements. Each node u member of a set V is associated with a positive weight $w_u \geq 0$ that represents its traffic load, an indicator of its location or geographical position and a binary flag whose purpose is to distinguish relay nodes from eNBs. Every link (u,v) between two relay nodes or between a relay node and a donor eNB has a positive weight $r_{(u,v)} \geq 0$ that represents the corresponding handover rate. In FIG. 1, as well as in FIGS. 2-4, links within a cluster (intra-cluster links) are depicted as solid lines, whereas links between two network nodes belonging to different clusters (inter-cluster links) are depicted as dashed lines.

It is assumed that initially a planning tool determines the radio access network arrangement defining also certain associations among relay nodes and donor eNBs. Considering the graph G such associations among relay nodes and donor eNB are modeled as clusters dividing the graph into $S_1, S_2, \ldots, S_n$ sets with any two sets having dissimilar members, i.e. $S_i \cap S_j = \emptyset$, for all $i \neq j$. Thus, the network is divided into a plurality of clusters such that each cluster includes exactly one donor eNB. Further, it is noted that each relay node is associated to at least one donor eNB at any point in time.

A simple example demonstrating how the radio access network is modeled is illustrated in FIG. 1a, where a total of three clusters—clusters A, B and C—is depicted. Cluster A has four associated relay nodes, whereas clusters B and C each have three associated relay nodes. The cuts that separate neighbored clusters from each other are illustrated by solid double lines.

In the embodiment of FIG. 1a cluster A experiences a problem as it includes an area of high load, which is indicated by the elliptic curve and which affects two of the relay nodes associated to the donor eNB of cluster A. At the same time, there is a high inter-cluster UE handover rate between the donor eNB of cluster A and a relay node associated to the donor eNB of cluster B.

Figure 1B:
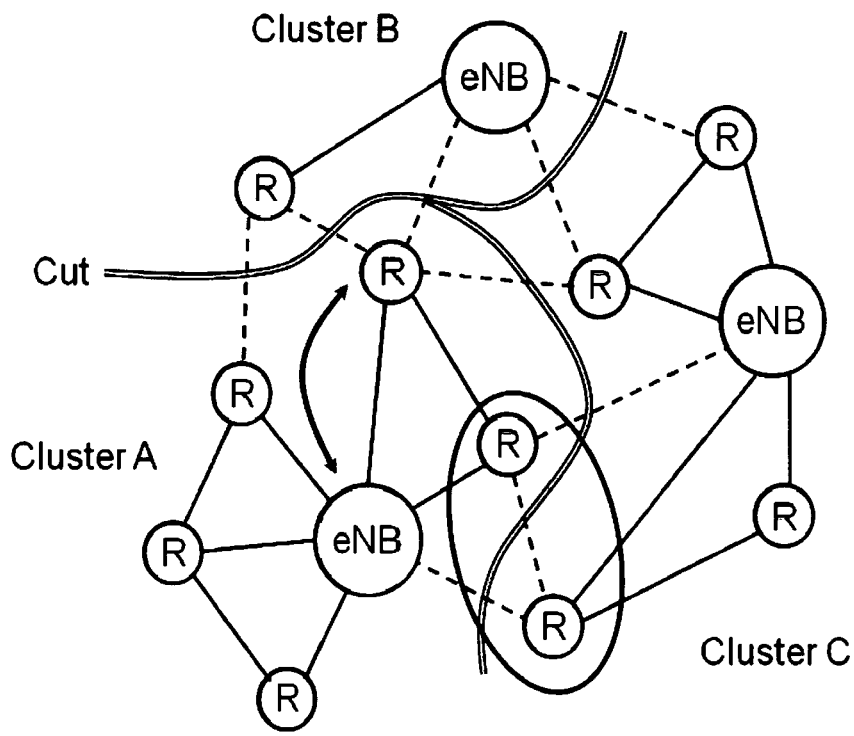

How this problem can be efficiently solved is illustrated in FIG. 1b. In order to resolve the high inter-cluster handover rate the association of the respective relay node is shifted from cluster B to cluster A, thereby transforming the high inter-cluster handover rate into a high intra-cluster handover rate, which is much cheaper. As a consequence the overall load of the donor eNB of cluster A will increase and might exceed a predefined maximum threshold. To resolve this problem load balancing can be performed by shifting one of the relay nodes of the high load area from cluster A to cluster C, as also illustrated in FIG. 1b.

Figure 2A:
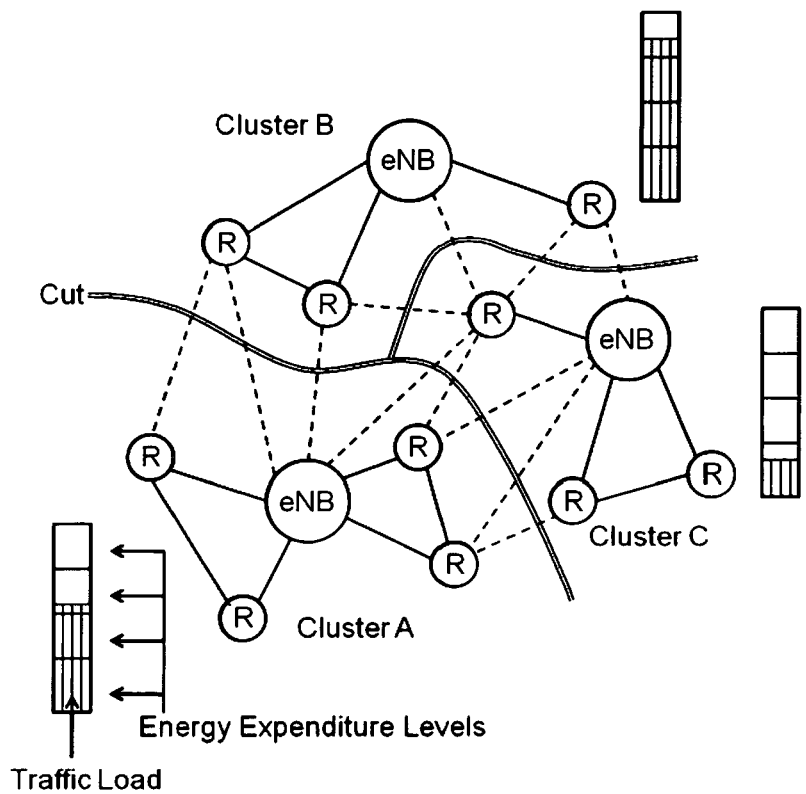
Figure 2B:
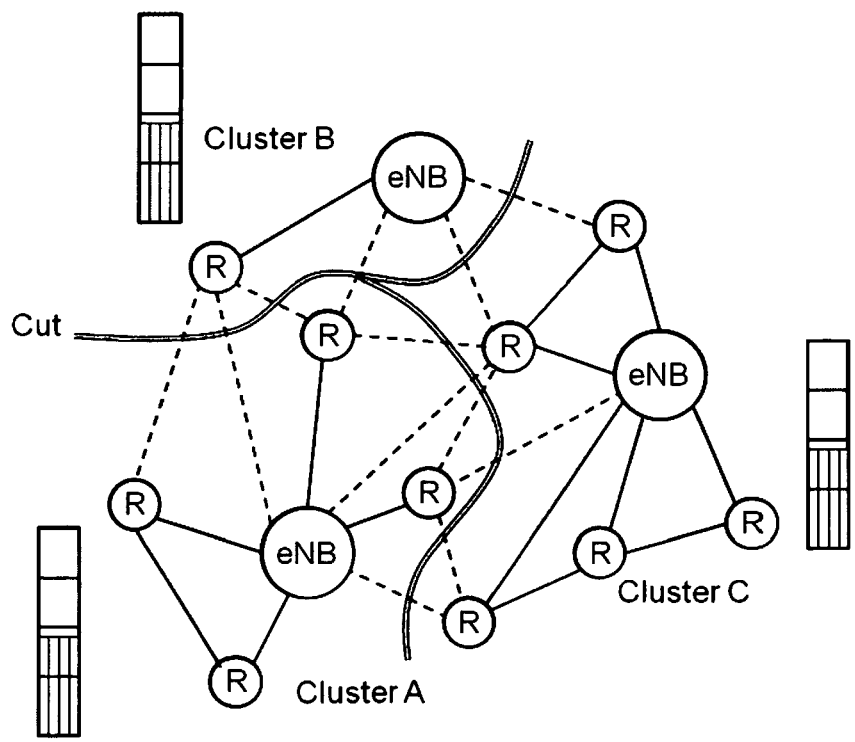
Figure 3:
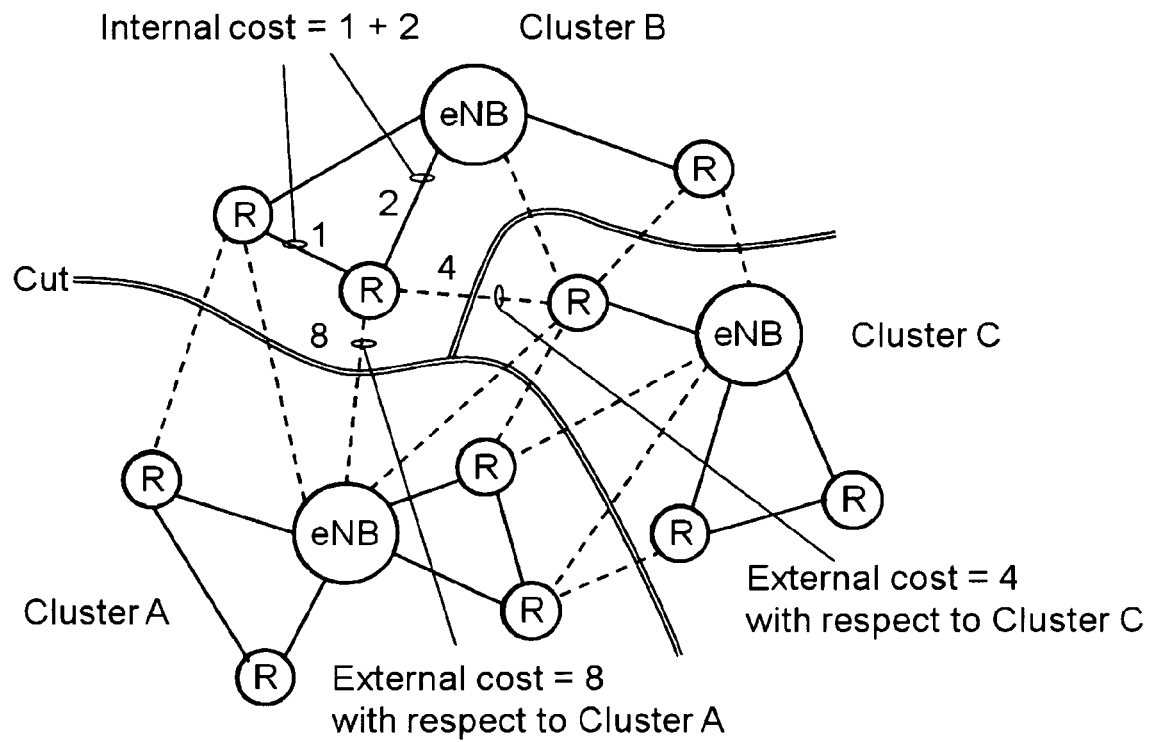

FIG. 2a illustrates another simple example where the eNB of cluster B consumes significantly more energy compared to the equivalent ones of cluster A and cluster C, as indicated by the respective bar diagrams. Re-arranging the association of relay nodes as indicated in FIG. 2b, i.e. by shifting one relay node from cluster B to cluster A or, more precisely, by changing the association of one relay node from the donor eNB of cluster B to the donor eNB of cluster A, and by shifting in return another relay node from cluster A to cluster C, decreases the energy consumption of cluster B and despite the traffic load increase in clusters A and C it is expected to reduce the overall network energy consumption due to the scaling of the energy expenditure levels.

FIG. 3 is a simple example of an embodiment of the present invention demonstrating the concept of "node gain" in some more detail. As mentioned before, an object of the present invention is to exchange relay stations between neighboring clusters in order to reduce the inter-cluster handover rates and provide load balancing among neighboring clusters. To accomplish such targets an iterative improvement algorithm is adopted, which performs a series of relay node—donor eNB association changes. Such algorithm requires load, mobility and geographical information regarding particular relay and donor eNB elements. Donor eNBs may provide such information based on regular monitoring of load and mobility regarding their side including the associated relay nodes. Geographical information related with donor eNBs may be provided in prior or discovered in a similar way as relay nodes using positioning information.

Such input data is provided to either the centralized management entity or to a specific eNB, which collects information regarding the problematic cluster and its two hop neighbors since this is the scope of the proposed algorithm. In particular, the algorithm considers a weight related to the load of each relay node and a node gain associated with shifting a relay node towards a specific neighbor cluster. The node gain quantifies the benefit in terms of handover rate or in graph theory terms cut improvement for moving a relay node from one cluster to another, and is calculated based on the cost of the cluster-internal and -external handover rates as illustrated in the simple example of FIG. 3.

It should be again noted that the aim of the proposed algorithms is not intended to identify the optimum solution but instead to provide a solution that satisfies the imposed load and handover rate targets. In other words, the output of the proposed algorithm would not be a radio access network with nearly equally loaded clusters having nearly equal inter-cluster handover cost, but a radio access network with each cluster load and inter-cluster handover rate below pre-determined thresholds. In addition, the algorithm of the present invention starts off from the existing network formation rather than starting from scratch. In this way fewer changes regarding the re-association of relay node and donor eNBs are likely to occur.

Figure 4A:
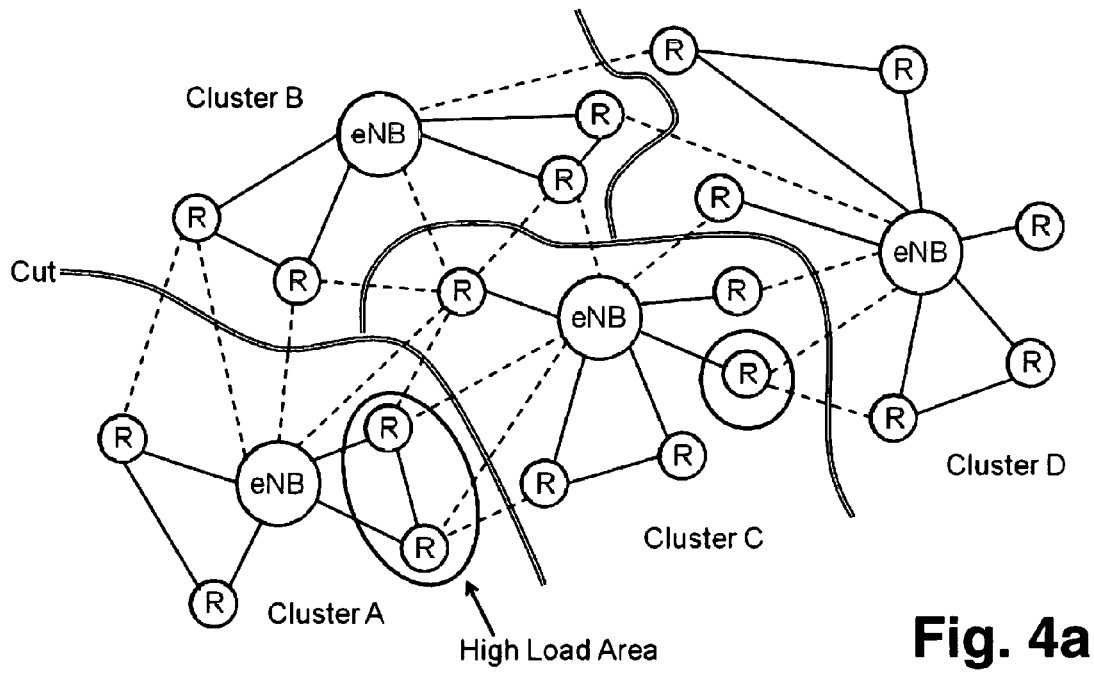
Figure 5:
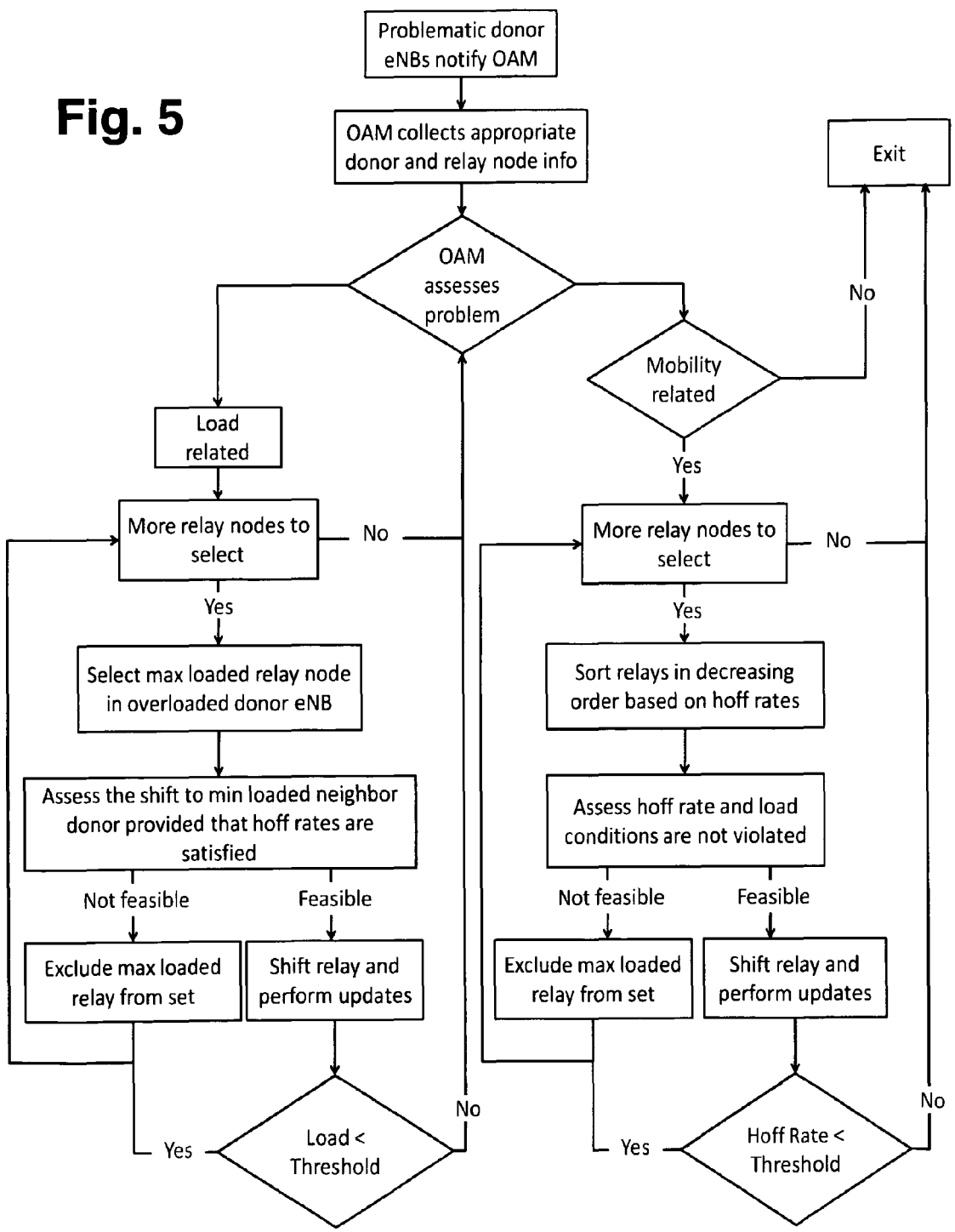

An example of an application scenario of the described algorithm in accordance with the present invention is depicted in FIGS. 4a/4b. The illustrated approach contributes to minimizing the overall amount of relay node—donor eNB association changes, since it attempts to tackle the overload problem at its core, i.e. in the area where the overload is located. Otherwise, a potentially higher amount of changes might be needed. A mechanism that keeps track of the changes introduced by the neighbor-to-neighbor relay node shifting scheme and compares them with one or more alternative solutions is also employed to ensure the best solution option. In addition, this approach may enhance the solution space in case an overloaded cluster has highly loaded neighbors for obvious reasons.

Figure 4B:
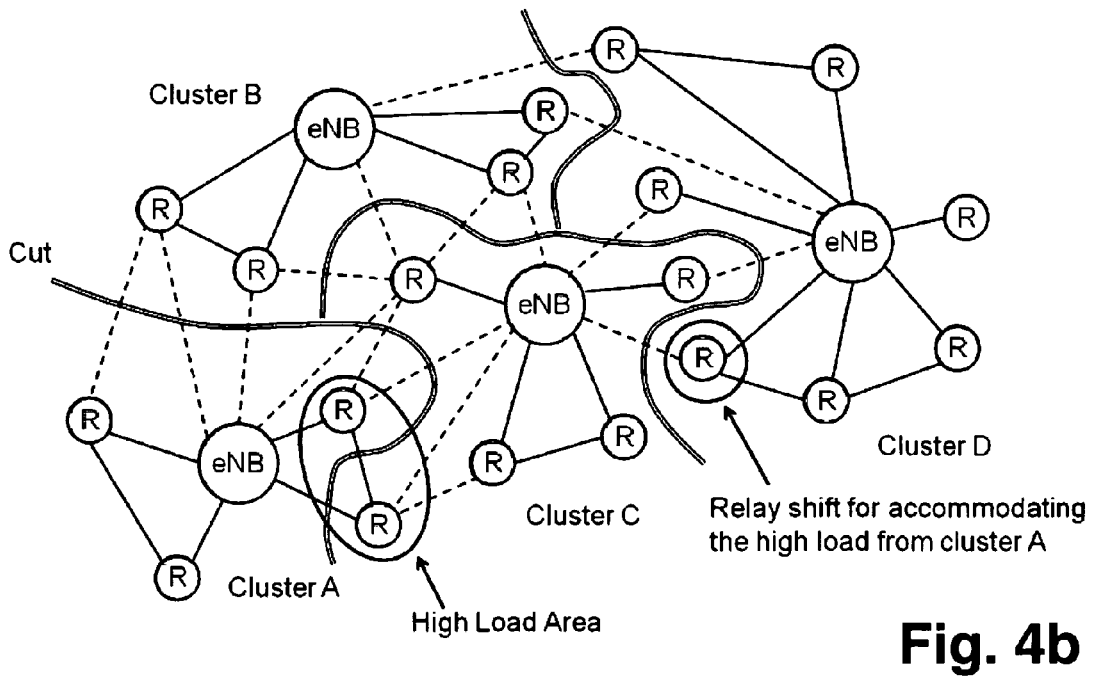

In FIG. 4a, the algorithm is triggered by the donor eNB of cluster A, which experiences a high load area (indicated by the elliptic curve). A solution of the problem would be to shift one of the encircled relay nodes of the high load area of cluster A to a neighbored cluster, i.e. in the scenario of FIG. 4 to cluster C. However, it is assumed that cluster C is already heavily loaded and thus, in principle, cannot accommodate another relay node. In such cases it proves to be particularly useful to employ a policy that does not consider directly neighbored cluster only, but two hop clusters as well. In the situation of FIG. 4, for instance, this means that also cluster D is considered, which is assumed to be only lightly loaded and to have a sufficiently high amount of unused resources. To take advantage of this situation a two-stage procedure is executed. On the one hand, as illustrated in FIG. 4b, one of the relay nodes of the high load area of cluster A is shifted to cluster C, and on the other hand, at the same time a relay node of cluster C (the encircled one in FIGS. 4a/b) is shifted from cluster C to cluster D in order to enable cluster C to accommodate the high load from cluster A. The information required for performing the describe procedure may either be performed in a centralized management entity, or may be negotiated among the involved donor eNBs and relay nodes in a distributed fashion.

A high-level flow diagram of an embodiment of a centralized algorithm according to the present invention is provided in FIG. 5. The algorithm begins via a triggering from the problematic clusters. Once the centralized management entity OAM is notified it collects all appropriate information from the corresponding neighbor donor eNBs and associated relay nodes. It then assesses the problem and takes different actions depending on whether there is an overload or a mobility specific problem. It should be noted that in case of a double problem, i.e. load and mobility, the algorithm first resolves load and then mobility.

Specifically, if the problem is concerned with load, it sorts all donor eNBs in an increasing load order and all relay nodes and problematic donors in a decreasing load order. It then selects the maximum loaded problematic donor eNB, and among its associated relay nodes it picks the maximum loaded one and tries to shift it towards its minimum loaded neighbor donor provided that the mobility constraints are satisfied. If such shift is feasible, it performs the corresponding load and handover rate updates and selects the next maximum loaded relay node starting from the beginning again. Otherwise, if such shift is infeasible it checks whether a neighbor relay node shift towards its other neighbor clusters may produce enough capacity for accommodating the load of the initially selected relay node. If the load space is enough for accommodating the initially selected relay node, the algorithm performs the appropriate updates and continues.

Before performing the update procedure following the procedure described above, it is recommended for the algorithm to store the amount of related shifts and roll back to select the second maximum load relay node and repeat the same process. In this way the algorithm could ensure of the selection quality in terms of moves and performance. Such step is optional since in most cases it is expected that shifting the maximum loaded relay may solve the overload problem. The algorithm continues considering donor eNB in a decreasing load order until all problematic clusters is no longer overloaded. Once all donor eNBs are no longer overloaded or if the initial problem was concerned with handover optimization, the algorithm identifies the problematic clusters and sorts their relay nodes according to the node gain. It then examines each relay node and performs a shift towards a neighbor cluster that may accommodate it in terms of load if the node gain is positive, i.e. if there is a reduction in the inter-cluster handover rate. Otherwise, it selects the next relay node until the mobility optimization problem is resolved or there are no more relay nodes to consider.

The corresponding distributed algorithm is similar to the centralized one but it is performed at each problematic donor eNB or at each donor eNB selected by coordination donor eNB. Although the steps of the algorithm are the same there are two main differences that may impact its performance significantly. One difference is concentrated on the scope of information, i.e. each problematic partition considers only its neighbors and the neighbors of them. The second is concerned with the synchronization among individual problematic donor eNBs. Both differences are based on the fact that multiple problematic eNBs might execute the algorithm at the same time affecting the same neighboring clusters simultaneously. To avoid further problems on such clusters the following policy is defined on each donor eNB.

Once a cluster is required at the same time by more than one problematic partition it should participate on the re-configuration process that is more in need, for instance clusters that experience high overload or mobility specific problems have priority.

Once a cluster is engaged in a re-configuration process it cannot participate in another at the same time.

Further differences in terms of the algorithm details include the absence of a sorting mechanism for the problematic donor eNBs and a select process of the highest loaded one since in distributed version there is only a single problematic donor, the one that executes the algorithm.

However, in any case the network entity that executes the algorithm, i.e. either the centralized management entity or a donor eNB, requires some intelligence regarding triggering of the re-configuration algorithm and some extra processing power to execute it.

It is worth noting that both algorithms may also easily consider the option of shared relay nodes, where a relay node has more than one interface towards more than a single donor eNB. The main benefit of considering shared relays is to optimize mobility and the handover rates, being particularly useful for cases that encounter ping-pong effects. Another option would be a scheme, which adaptively changes the association of shared relays in order to capture evolved ping-pong handovers among particular relay nodes and donor eNBs. The main difference would be that instead of considering the gain of shifting relay nodes towards certain donor eNBs, the handover rate weight of a specific link is considered.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for performing relay node configuration and re-configuration in relay enhanced networks,
wherein said network includes a plurality of eNBs that function as donor eNBs providing wireless access to associated relay nodes, wherein said relay nodes function as eNBs from a UE perspective,
characterized in that said network is divided into clusters such that each cluster includes exactly one donor eNB and that each relay node is associated to at least one donor eNB any point in time,
wherein the load of donor eNBs and the handover rates among relay nodes as well as between donor eNBs and relay nodes are monitored and/or estimated,
wherein the association of relay nodes to donor eNBs is performed on the basis of the results of said monitoring and/or estimation.

2. Method according to claim 1, wherein the association of relay nodes to donor eNBs is controlled by a centralized management entity.

3. Method according to claim 1, wherein the association of relay nodes to donor eNBs is performed in a distributed fashion by the donor eNB coordinating with each other.

4. Method according to claim 1, wherein each new relay node, upon being placed into said network, advertises itself as a relay node to be associated with a donor eNB.

5. Method according to claim 4, wherein the donor eNBs that receive an advertising message from a new relay node trigger a self-configuration procedure for the new relay node at said centralized management entity.

6. Method according to claim 4, wherein the donor eNBs that receive an advertising message from a new relay node propagate to said centralized management entity an estimation regarding the load and/or handover rates associated with the position of the new relay node.

7. Method according to claim 4, wherein the donor eNBs that receive an advertising message from a new relay node coordinate with each other and perform a configuration procedure for the relay node in a distributed fashion.

8. Method according to claim 7, wherein in the coordination process the donor eNBs select the least loaded one as donor eNBs that is responsible for the configuration procedure.

9. Method according to claim 7, wherein conflicts among the donor eNBs in the coordination process are resolved by considering the status of neighbor eNBs.

10. Method according to claim 1, wherein the donor eNBs provide load, mobility and/or geographical information with respect to associated relay nodes.

11. Method according to claim 1, wherein load balancing among neighbor donor eNBs and/or inter-cluster handover rate reduction is performed by means of changing the association of relay nodes.

12. Method according to claim 1, wherein relay node association changes are carried out according to an iterative algorithm that, for a specific cluster under consideration, considers a weight related to the load of each relay node associated to the specific cluster and a node gain yielding from a shift of a relay node towards a specific neighbor cluster.

13. Method according to claim 12, wherein said algorithm is triggered from a problematic cluster whose donor eNB experiences problems in terms of load and/or handover rates.

14. Method according to claim 13, wherein said centralized management entity, upon being notified by the trigger, selects the maximum loaded donor eNB and its maximum loaded associated relay node and performs an update procedure by trying to shift it towards its minimum loaded neighbor donor eNB.

15. Method according to claim 13, wherein, before performing the update procedure, the amount of related relay node shifts is stored and compared with an alternative update procedure calculated for the second loaded donor eNB.

16. Method according to claim 12, wherein said algorithm considers direct and two hop neighbor clusters of said specific cluster under consideration.

17. Method according to claim 12, wherein different neighbor-to-neighbor relay node shifting solutions are considered and compared with each other, wherein a mechanism is provided that keeps track of the changes introduced by the different solutions.

18. Method according to claim 12, wherein donor eNBs are prioritized in case of conflicts resulting from more than one donor eNBs whishing to execute said algorithm at the same time thereby affecting at least one neighboring cluster simultaneously.

19. Method according to claim 12, wherein a policy is defined on each donor eNB according to which a cluster is allowed to be engaged only in a single relay node re-configuration process at the same time.

20. Method according to claim 12, wherein a problematic donor eNB, upon receiving load and/or mobility information regarding neighbor donor eNBs and their associated relay nodes, assesses the applicability of the neighbor donor eNBs in terms of geographical constraints.

21. Method according to claim 12, wherein said algorithm is configured to not permit a relay node, which was shifted from its previous donor eNB to another donor eNB, to be shifted back to its previous donor eNB for a configurable time period.

22. Method according to claim 12, wherein said algorithm is applied to shared relay nodes to change the multi-donor eNB association.

23. An apparatus for performing relay node configuration and re-configuration in a relay enhanced network with a 3GPP LTE-Advanced architecture, including for executing a method according to claim 1, wherein said network includes a plurality of eNBs that function as donor eNBs providing wireless access to associated relay nodes, wherein said relay nodes function as eNBs from a UE perspective, the apparatus comprising: a computing device configured as a centralized management entity operating to
i) divide said network into clusters such that each cluster includes exactly one donor eNB and that each relay node is associated to at least one donor eNB any point in time,
ii) receive monitored and/or estimated information regarding the load of donor eNBs and the handover rates among relay nodes as well as between donor eNBs and relay nodes, and
iii) perform association of relay nodes to donor eNBs is on the basis of the results of said monitored and/or estimated information.

* * * * *